Figure 9:
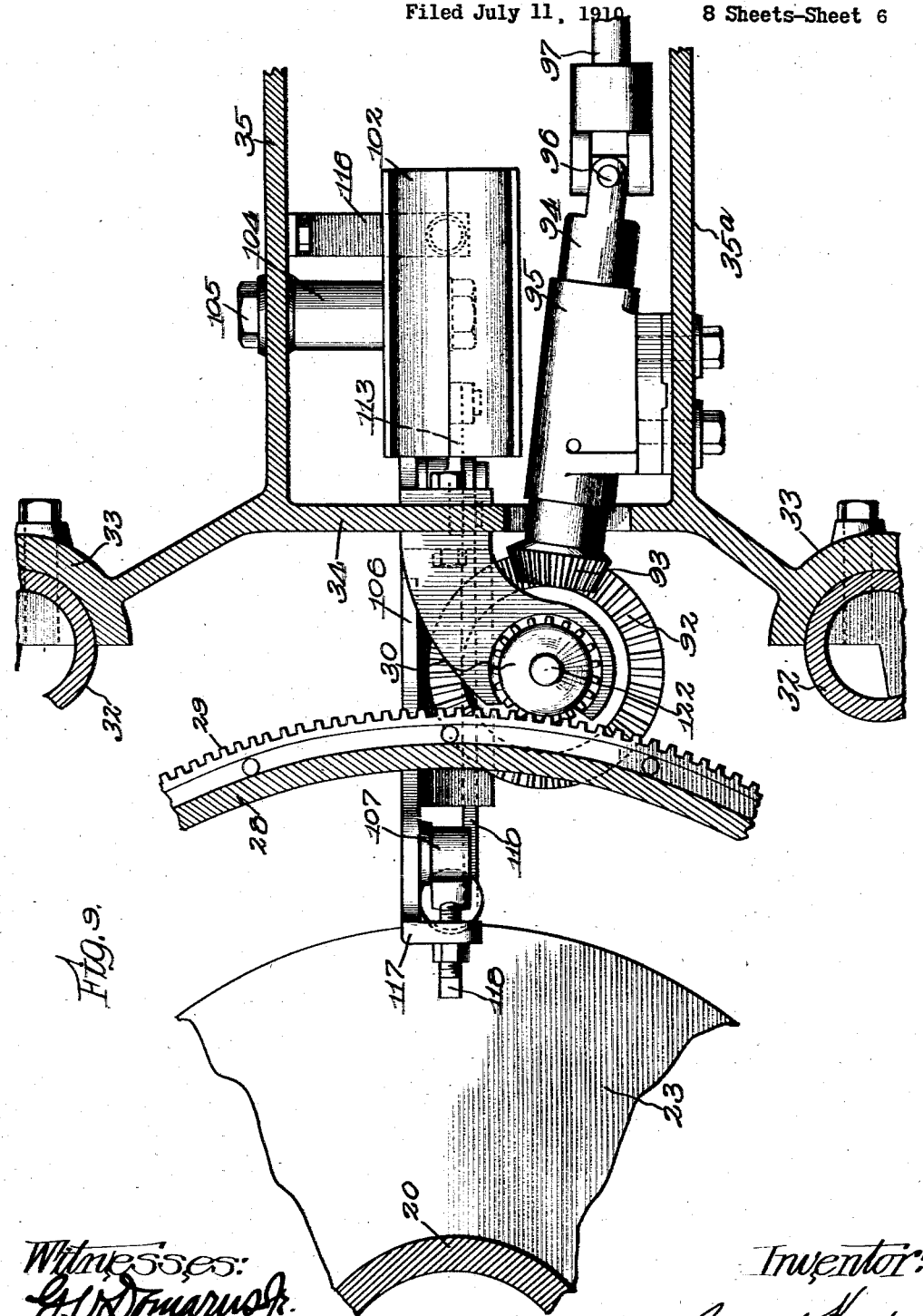

Feb. 24, 1925. 1,527,557
A. KADOW
GLASS FORMING MACHINE
Filed July 11, 1910 8 Sheets-Sheet 1
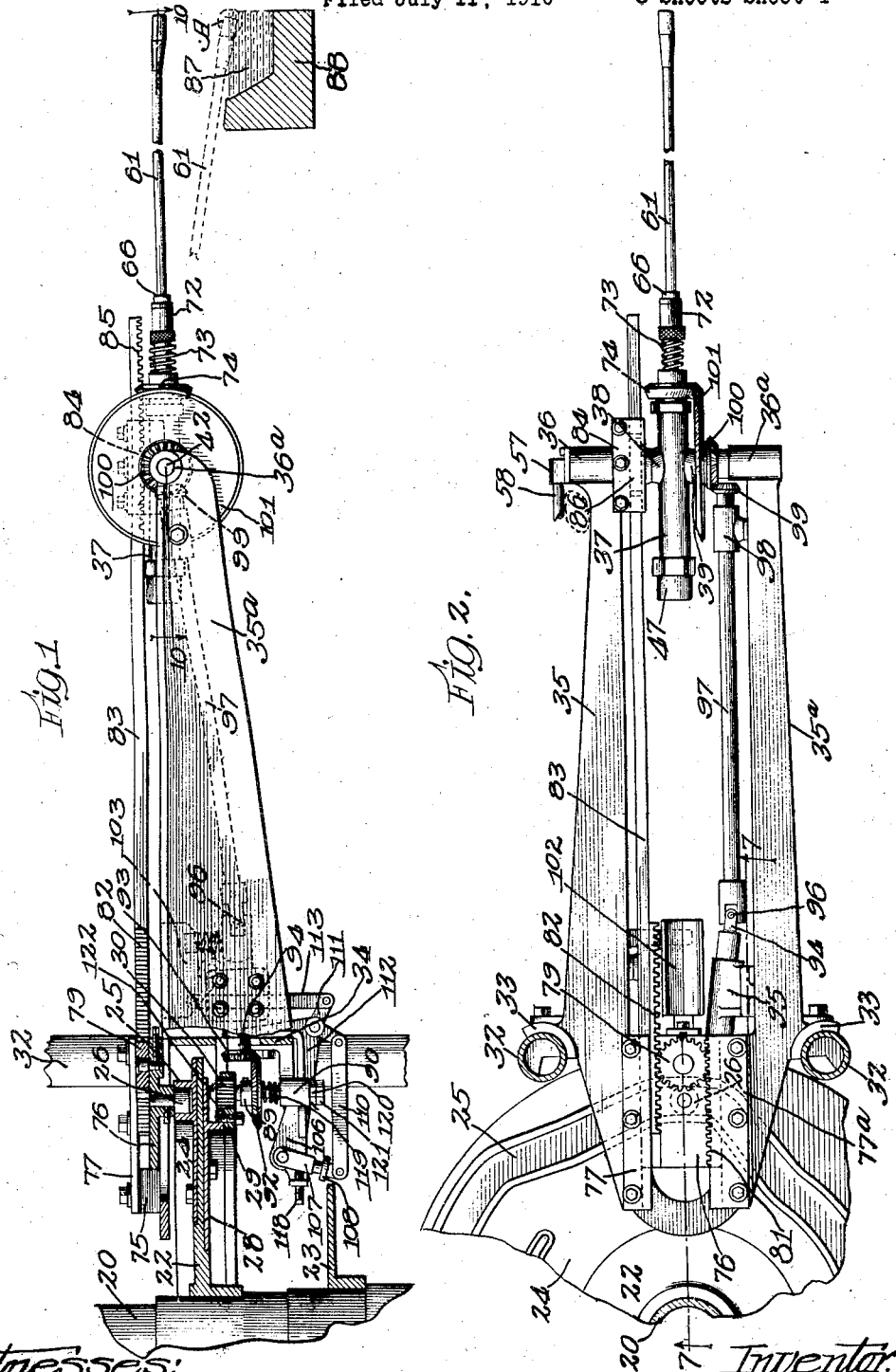

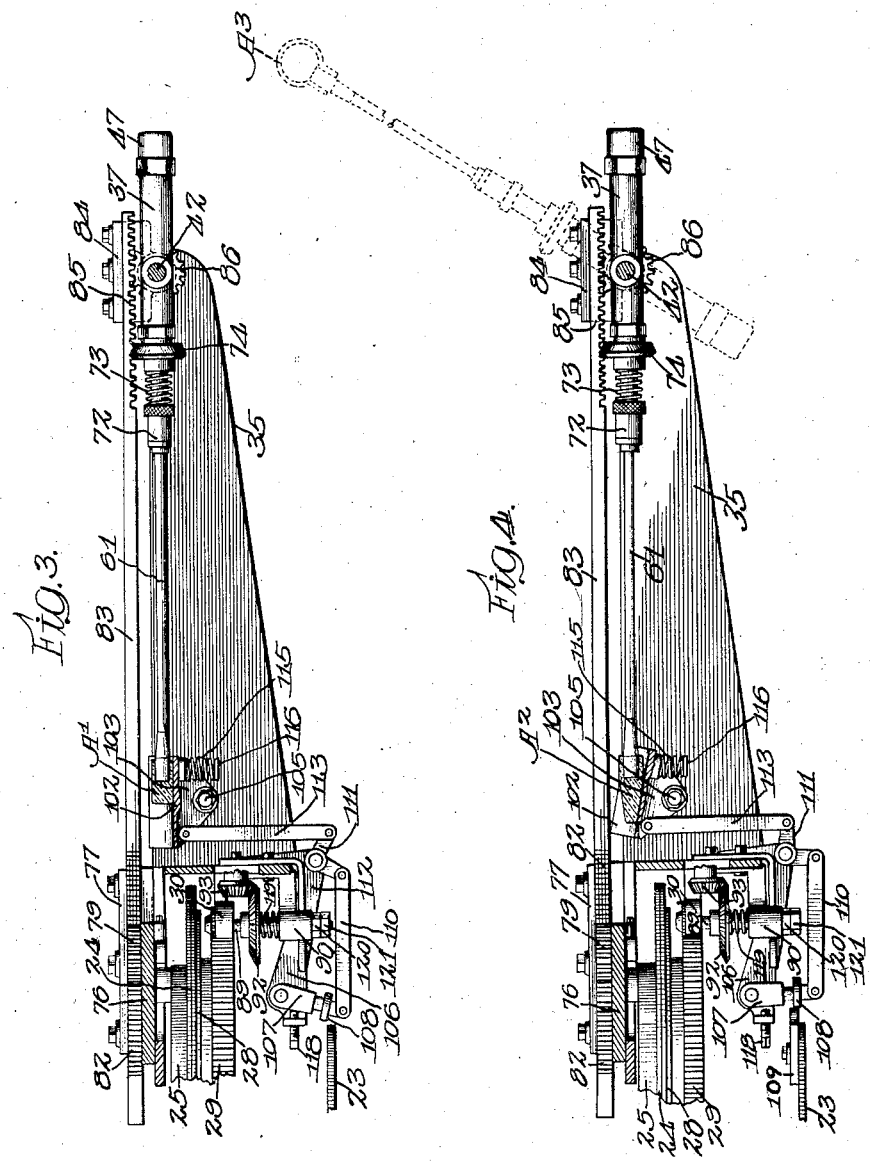

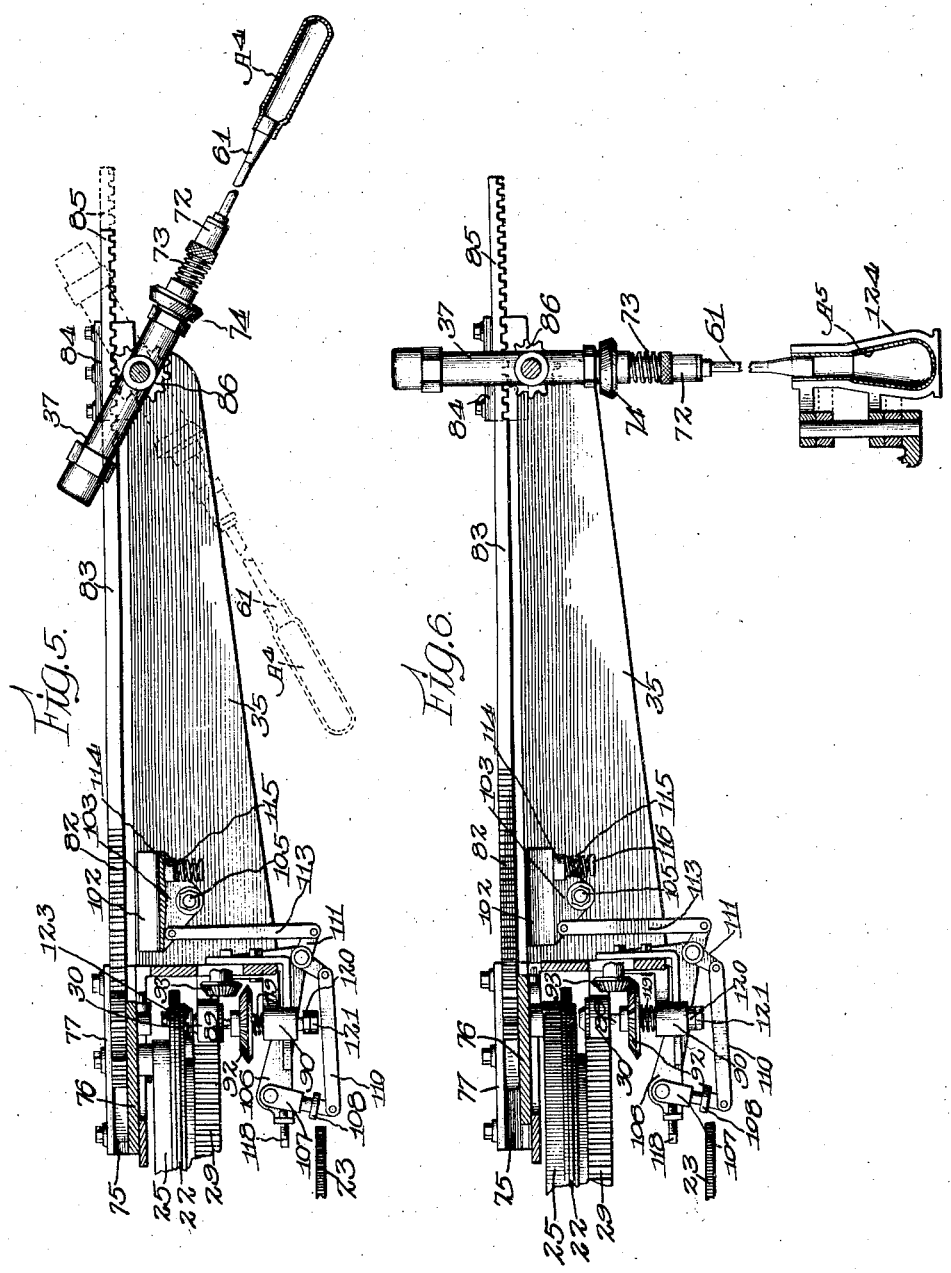

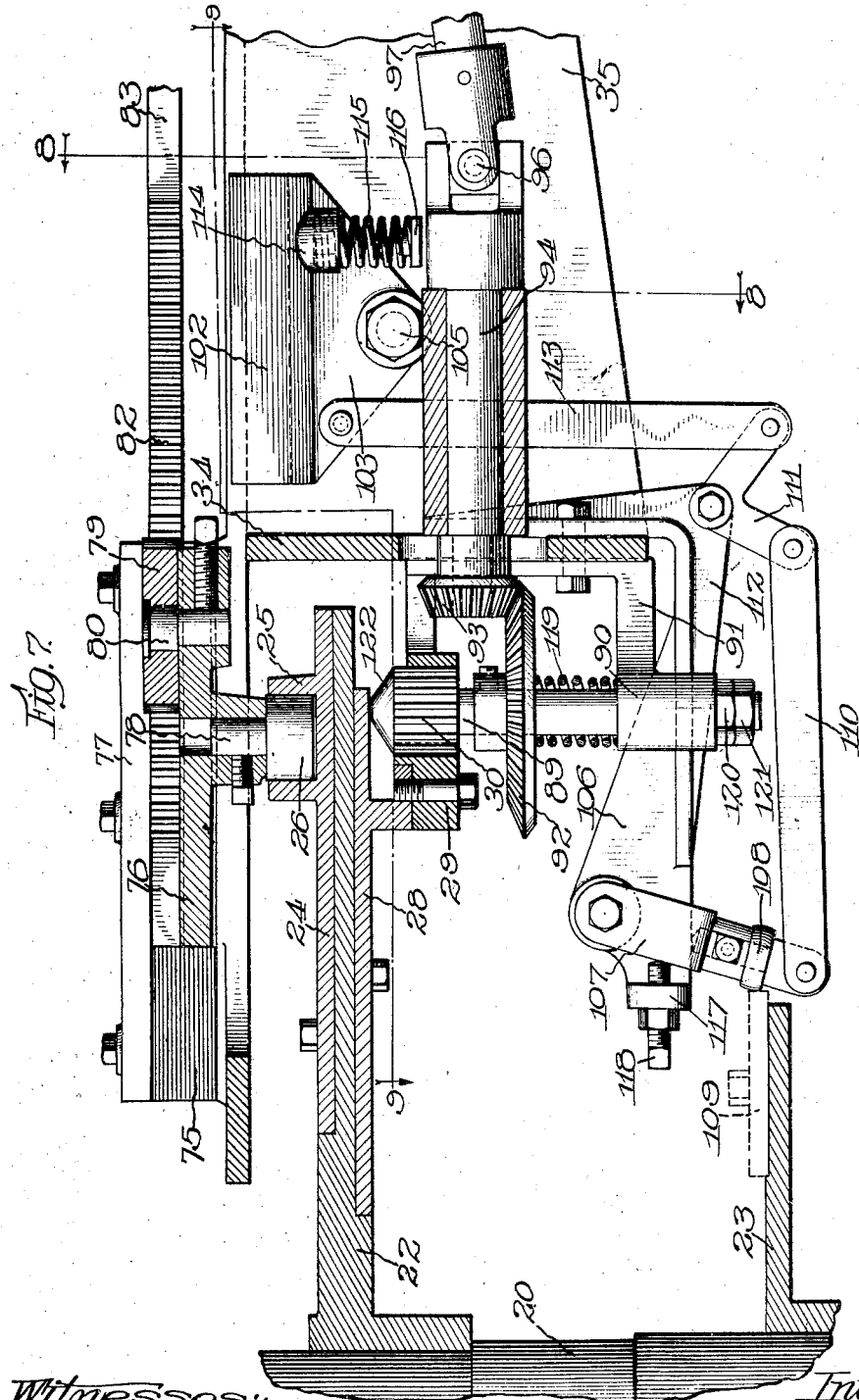

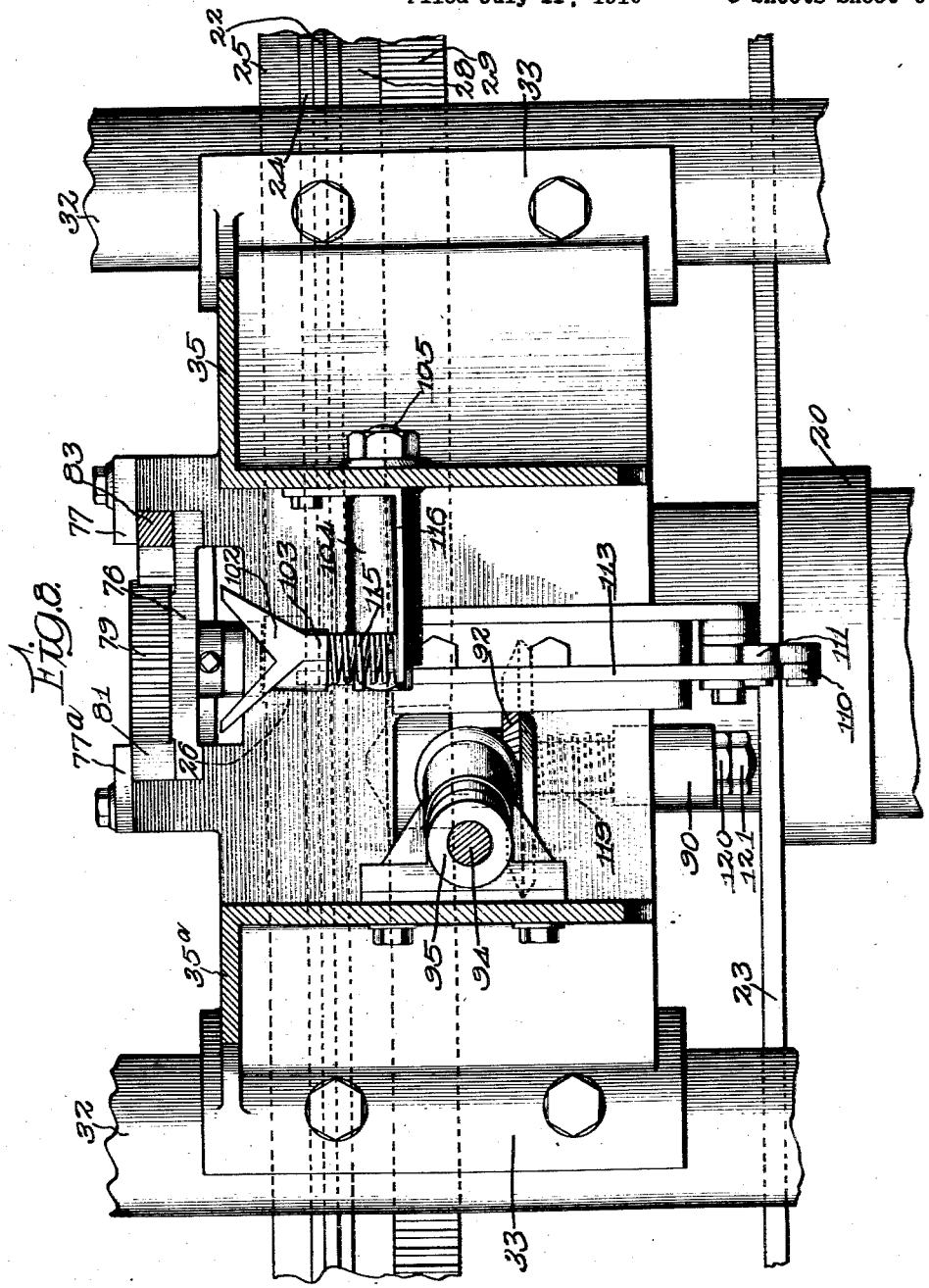

Feb. 24, 1925.

A. KADOW 1,527,557

GLASS FORMING MACHINE

Filed July 11, 1910

8 Sheets-Sheet 6

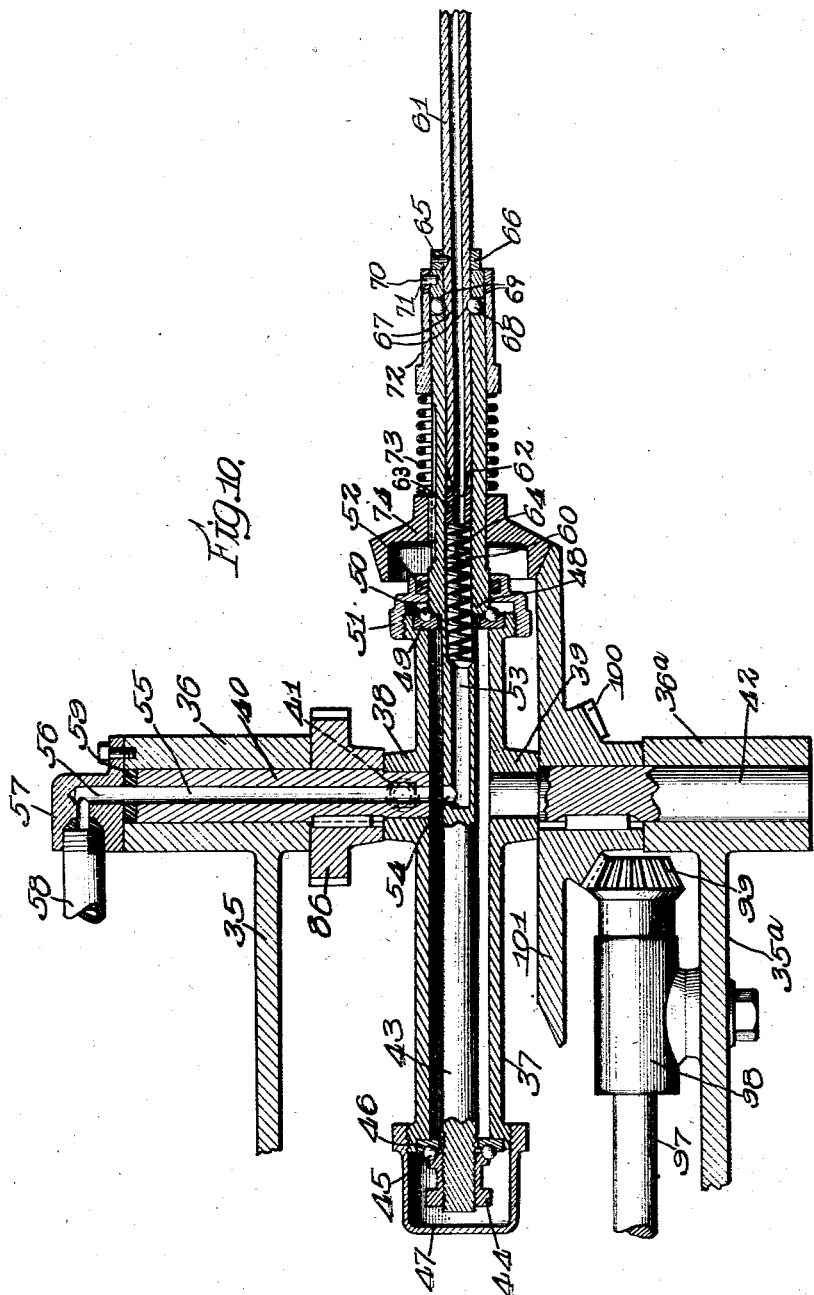

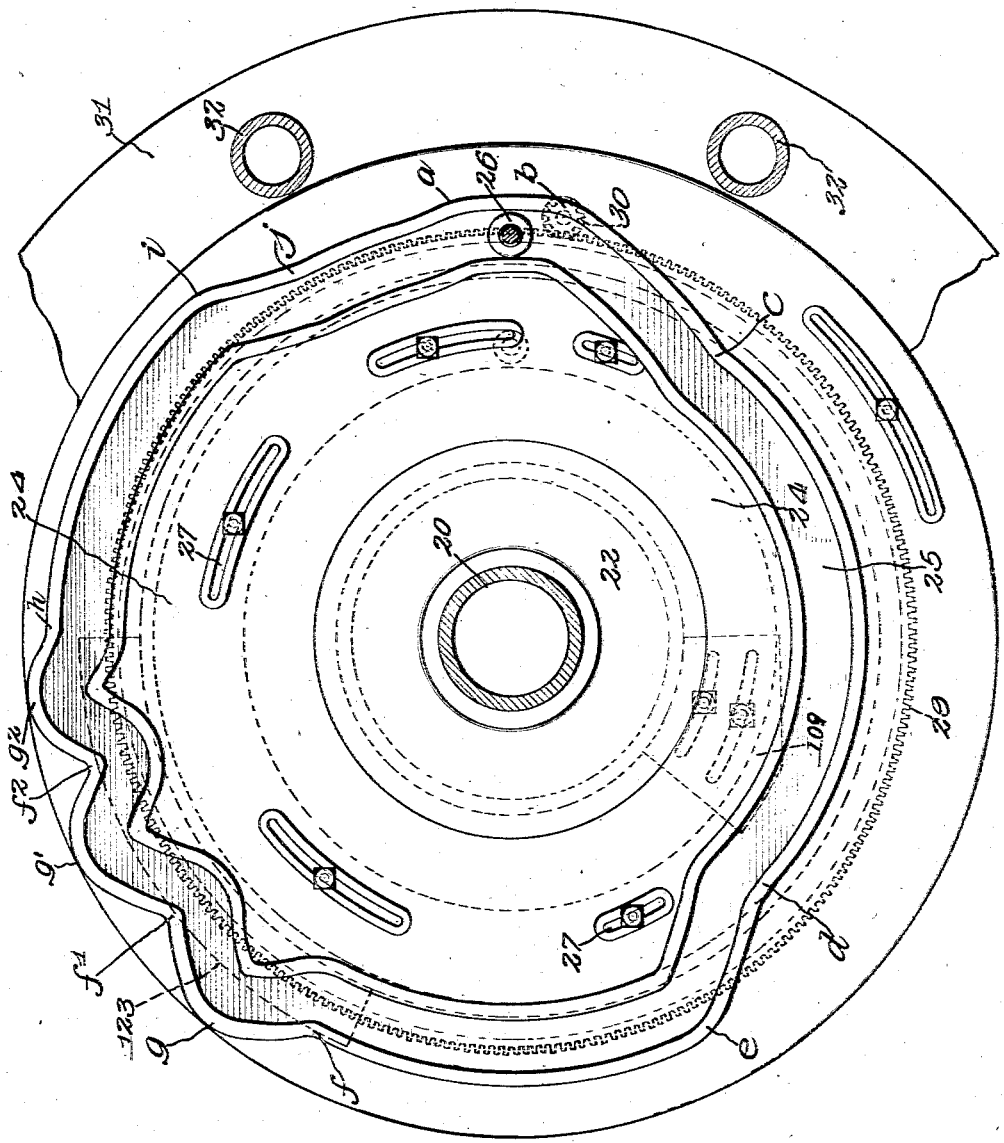

Patented Feb. 24, 1925.

1,527,557

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

GLASS-FORMING MACHINE.

Application filed July 11, 1910. Serial No. 571,442.

*To all whom it may concern:*

Be it known that I, AUGUST KADOW, a citizen of the United States, residing at Toledo, in the county of Lucas and State of Ohio, have invented certain new and useful Improvements in Glass-Forming Machines, of which the following is a specification.

My invention relates to a machine for forming hollow glass articles, such, for example, as incandescent electric light bulbs; and the invention has for its object to provide new and improved apparatus for performing automatically certain operations in the manufacture of articles of the sort which heretofore have ordinarily been carried out by hand labor.

The invention has for one of its principal objects to provide a glass gathering device of novel and improved construction which can be oscillated so as to bring the body of glass held thereon into different positions which it must take while being operated upon to produce the article to be manufactured; and in which the gathering member, that is, the blow pipe or other element which gathers or supports the body of glass operated upon, is axially rotatable so that the blank of glass may be revolved on its axis either during the oscillating movements of the gathering device, or at other times, as may be required by the conditions under which the article is manufactured.

A further object of the invention is to provide suitable mechanisms for automatically effecting the above mentioned oscillating and revoluble movements of the parts of the gathering device.

A further object of the invention is to provide means whereby the mechanism for axially revolving the blank may be cut out of action when this is necessary or desirable.

A further object of the invention is to provide an oscillating and revoluble gathering device through which air under pressure may be directed so as to act upon the blank.

The invention has for further objects the certain new and improved constructions, arrangements and devices in glass forming apparatus which will be hereinafter described and claimed.

The invention is illustrated in a preferred embodiment in the accompanying drawings, wherein—

Fig. 1 is a fragmentary side elevation of the machine with certain parts shown in section.

Fig. 2 a plan view of the parts shown in Fig. 1.

Fig. 3, 4, 5 and 6 vertical sectional views of said apparatus showing the parts in different operative positions.

Fig. 7 a sectional view taken on line 7—7 of Fig. 2, looking in the direction of the arrows.

Figs. 8 and 9 sectional views taken on respectively lines 8—8 and 9—9 of Fig. 7, looking in the direction of the arrows.

Fig. 10 a sectional plan taken on line 10—10 of Fig. 1, and

Fig. 11 a sectional plan showing the operating cam.

Like characters of reference indicate like parts in the several figures of the drawings.

The invention is embodied in a machine consisting, broadly speaking, of a central column which is stationary, around which revolves a frame which carries the operative devices of the machine, which latter are actuated to perform in succession the several operations which the machine is designed to carry out through the instrumentality of stationary cams and a rack located on the column.

Referring to the drawings, 20 designates the stationary column to which are secured the cam carrying rings 22 and 23. To the upper side of the former is bolted the cam member 24 on which is formed the cam or cam-way 25 in which operates the cam roller or follower 26. The cam member 24 is preferably formed with the slots 27 for adjustment on the ring 22. On the under side of ring 22 is bolted a ring 28 to which is bolted a circular rack 29 which is meshed by a pinion 30. These two mechanisms, the cam mechanism and the rack and pinion mechanism accomplish most of the operations which the machine performs. Certain other operations are performed by other cams which will be hereinafter described.

The manipulation of the glass is performed by means of a gathering device pivotally and revolubly mounted on the frame which revolves about the pillar 20. On this frame the lower member or platform of which is designated 31 (Fig. 11) are two standards 32, to which are bolted the brackets 33 of a frame consisting of the vertical web 34 and the preferable angular projecting supporting members 35, 35ª. On the ends of the latter are bearings 36, 36ª which rotatably support the gathering device or blow pipe.

The gathering device or blow pipe is preferably constructed as follows: 37 is a hollow casing formed with bosses 38 and 39. Boss 38 receives the end of a shaft 40, which turns in bearing 36, the boss being secured to the shaft by the set-screw 41 (Fig. 10). Boss 39 is supported, but revolubly on the end of a shaft 42 in bearing 36ª. Within casing 37 is a spindle 43, one end of which is threaded for the nut 44 which holds a set of balls 45 against their race-way 46 secured within the casing 37; these parts being enclosed by a cap piece 47. The spindle 43 is also formed with a shoulder 48, between which and the race-way 49 at the other end of casing 37 are a set of balls 50; these parts being enclosed by the cap piece 51 provided preferably with the packing 52. The spindle 43 is formed with a bore 53 communicating by a branch 54 with the space within the casing 37. The shaft 40 is formed with a bore 55 which registers with a bore 56 in a cap piece 57 which closes the end of bearing 36. Into the cap piece 57 is tapped a pipe 58 which is connected with a source of supply of compressed air (not shown). A packing washer 59 is interposed between the end of shaft 40 and cap piece 57. The bore 53 of spindle 43 is enlarged at 60 and receives the end of the glass gathering tubular member 61, the extremity 62 of which is preferably conical and fits into a rubber gasket 63, against which bears the coiled spring 64. To the gathering member 61 is secured by a pin 65, a stop collar 66 and the gathering member is formed with preferably two indentations 67 for the balls 68 which seat in perforations 69 in the end of spindle 43, to which is secured by a pin 70 a stop collar 71. Surrounding the end of spindle 43 is a sleeve 72 which is pressed against collar 71 by a spiral spring 73 which, at its other end, bears against a friction cone 74 feathered to spindle 43. The purpose of this arrangement is to permit the removal of the gathering member 61, which can be effected by pushing back sleeve 72 against the tension of spring 73 so as to allow the balls 68 to fall out of the perforations 69. The balls 68 clutch the gathering member to spindle 43.

It will be seen that the gathering device is so constructed and mounted that the gathering member 61 can oscillate in a vertical plane and also be revolved axially, while at the same time compressed air may be supplied thereto from the air pipe 58.

The mechanisms for giving the gathering device these movements and the operations which such movements accomplish will now be described.

The supporting members 35, 35ª are formed on their inner ends with machined ways 75, in which moves a slide 76 which is held in position by the overlapping strips 77, 77ª. The cam roller 26, which has been described as moving in the cam way 25, turns on a pivot 78 secured to the under side of slide 76. On the upper side of slide 76 is a pinion 79 turning on a pivot pin 80. The pinion 79 meshes on one side with a rack 81, formed on the strip 77ª, and on the other side with a rack 82 secured to a rod 83, square in cross section, which slides on the slide 76 under strip 77 and at its other end in a guide 84 (Figs. 1 and 2) secured to the bearing 36 on supporting member 35. This end of the rod 83 is formed on its under side with a rack 85 which meshes with a pinion 86 (Figs. 4 to 6 and Fig. 10), keyed to shaft 40. By means of this mechanism the movement of the cam roller in the cam-way 25 away from or toward the column 20 gives an oscillating movement in one direction or the other to the glass gathering and forming device. The movement of the rod 83 has double the amplitude of that of the cam. The first movement of the gathering and forming apparatus in the cycle of its operations is the movement by which it is dipped in the glass pot. Supposing the parts to be in the position shown in Fig. 1, their initial position relative to the cycle of operations of the machine, the movement of the cam follower outwardly in the cam-way causes the gathering member 61 to dip down into the body of glass 87 in the glass pot 88, which is opposite the revolving gathering mechanism at this period of its travel. As the cam follower 26 moves inwardly the gathering mechanism is moved out of the glass pot 88. The dipping position of the gathering member 61 is shown in dotted lines in Fig. 1.

In order to gather the glass on the end of the gathering member 61 the latter is axially revolved while it is in the glass pot. This is accomplished by the following mechanism: The pinion 30, which has been described as meshing with the circular rack 29, secured to the under side of the cam-carrying ring 22, is fast on a shaft 89 turning in a bearing 90 on a bracket 91, bolted to the web 34 of the supporting frame, and carries the bevel gear 92 which meshes with a bevel gear 93 on a shaft 94 turning in a bearing 95 secured to the under side of the supporting member 35ª (Figs. 7, 8 and 9), the shaft 94 being swivelled at 96 to a shaft 97 turning in a guide 98 (Figs. 2 and 10), on supporting member 35ª and carrying a bevel gear 99 which meshes with a bevel gear 100 on a friction cone 101, which is keyed to shaft 42 and which frictionally engages the cone 74 described as having a feathered connection with the shaft 43. By this arrangement the gathering member 61 is rotated so long as the beveled gears 92, 93 are in mesh. The means for throwing these gears out of mesh in order to stop the rotation of the gathering member 61 will be described subsequently. The turning of the gathering member 61 results from its clutched engagement with shaft 43.

The next operation is to turn the gathering mechanism over into the substantially horizontal position shown in Fig. 3, 180° removed from the initial position of Fig. 1. This is for the purpose of marvering the blank or the body of glass gathered on the end of the gathering member 61.

The marver consists of a member 102 in the form of a V-shaped trough provided with a plate 103 having a hub 104 (Figs. 8 and 9), by means of which the marver is pivotally mounted on a bolt 105 secured to the vertical web of the supporting member 35. The gathering device is turned to the position of Fig. 3, with the blank (designated A in Fig. 1 and A' in Fig. 3) in contact with the marver by means of the rack and slide movement, above described, actuated by the retreat of the cam roller 26 inwardly in the cam-way 25. During this movement and while the blank is in the marver the rotation of the gathering member continues by the mechanism above described.

In order to give the blank the conical shape shown at A² in Fig. 4, the marver, during the latter part of the time in which the blank is in contact with it, is tilted, as shown in Fig. 4. This tilting movement is accomplished by the following mechanism: On a bracket 106, bolted to the web 34 of the supporting frame, is pivoted a lever 107 carrying a cam roller 108 which, at the proper time, meets a cam 109 bolted to the lower ring 23 on the column 20. Lever 107 is connected by a link 110 with a bell crank 111 pivoted to a web 112 on the under side of bracket 106, the other arm of bell crank 111 being connected with the marver by a link 113. The marver is formed with a socket 114 for a spiral spring 115 which rests upon a bracket 116 secured to the vertical web of supporting member 35. In order to keep the lever and link mechanism in proper position when the roller 108 is free from cam 109, the bracket 106 is formed with a lug 117 for an adjustable screw 118 which bears against the lever 107.

The blank having been brought to the form shown at A² in Fig. 4, the gathering device is turned out of the marver, first into the dotted line position shown in Fig. 4, at which time air may be admitted through the gathering device from air pipe 58, causing the blank to assume the hollow shape illustrated at A³ in Fig. 4. It will be understood that any preferred mechanism may be employed for controlling the delivery of the air to the gathering device. As such mechanism forms in itself no part of my present invention, it is not shown nor described. From the dotted line position of Fig. 4 the gathering device is turned to the full line position of Fig. 5. The device is then oscillated back and forth, for example, from the full line position of Fig. 5 to the dotted line position, in order to elongate the blank to the configuration shown at A⁴ of this figure. The movement of the gathering device from the marvering position of Figs. 3 and 4 to the full line position of Figs. 5 and the oscillating movement indicated in Fig. 5 are accomplished by means of the slide and rack mechanism actuated by the movements of the cam roller 26 in cam-way 25.

While the gathering device and blank are being swung back and forth, as shown in Fig. 5, which, it may be said, is preferably accompanied by a reduction of the air pressure, the axial revolution of the gathering member 61 and the blank is stopped. This is brought about by the following arrangement: The shaft 89 carrying gear 92 is mounted in its bearing 90 so as to be capable of endwise movement therein, and a spiral spring 119 is interposed between bearing 90 and bevel gear 92, the shaft 89 being preferably provided with the stop and lock nuts 120, 121. The upper surface of pinion 30 on the shaft is in the form of a frustum of a cone, designated 122, which part, at the proper time, meets a cam 123 (Figs. 5 and 11), with the result that the gear 92 is shifted out of mesh with gear 93. The axial revolution of the gathering member thereupon ceases, to be resumed again when the pinion 30 passes out from under the other end of cam 123, which is when the oscillation of the gathering device ceases.

The next movement of the cam roller 26 in the cam-way brings the gathering device into the vertical position of Fig. 6, and the blank is thereupon enclosed in a mold, preferably, a paste mold, designated 124. The means by which the mold may be made to enclose the blank forms in itself no part of my present invention, nor does the particular construction of the mold. If desired, this step of the manufacture might be carried out by hand. At this juncture, air at considerable pressure is admitted to the blank through air pipe 58 so that the blank is given the form shown at A⁵ in Fig. 6. At the same time, the rotation of the gathering member 61 recommences, the purpose of rotating the blank being to give the surface of the glass a high polish.

The slide and rack mechanism actuated by a further movement of the cam roller 26 then returns the gathering device, with the bulb thereon, to the initial horizontal position of the former, the mold, of course, having been removed, and the blank is removed from the gathering member 61 in any desired manner, and the gathering member is again dipped into the glass tank and again proceeds through the cycle of movements above described.

While the apparatus has been described as consisting in its operative parts of a single operating unit, it is obvious that if desirable, there might be a number of like units arranged to be operated by the same stationary cams and rack. As modifications in the form, construction, arrangement and in the particular instrumentalities provided for carrying out my invention will readily suggest themselves to those familiar with automatic machinery and with the glass art, I do not limit myself to the particulars shown and described except so far as the same are made limitations on certain of the claims herein.

The operation of the machine, as above described, will be readily understood from the above description. However, the sequence of the operative manipulations of the parts will be made clearer by reference to Fig. 11, which shows the course of the cam roller 26 in its cam-way 25. In this figure the cam roller is shown in the position which it takes between points $a$, $b$, while causing the gathering device to move from its initial horizontal position to its gathering position in the glass pot 88 (Figs. 1 and 2); the movement outwardly of the cam roller giving an outward movement to slide 76 and, through pinion 79 a multiplied movement in the same direction to rod 83 which, acting on the oscillating pinion 86, turns the gathering device to the position described. The movement of cam roller 26 from the point $b$ of the cam-way to the point $c$ turns the gathering device from the dotted line position of Fig. 1 upwardly and over to the position of Figs. 3 and 4. The interval indicated by the points $c$, $d$ on the cam, at which time the cam follower 26 has no movement, is the period in which the blank is in the marver. During the latter part of this period, roller 108 (Figs. 4 and 7) meets the marver cam 109 which, through the agency of the lever and link mechanism 107, 110, 111, 113 rocks the marver to the position of Fig. 4. From $d$ to $e$ the cam roller makes a sharp movement outwardly, which movement turns the gathering device to the full line position of Fig. 5, air being preferably admitted when the device is in the dotted line position of Fig. 4, the introduction of air continuing with the device in the full line position of Fig. 5, while the cam roller is passing from point $e$ to $f$. The next movement of the cam, from $f$ to $g$, swings the gathering device from the full line position to the dotted line position of Fig. 5; the movements of the cam to successive points $f'$, $g'$, $f^2$, $g^2$ repeating these oscillating movements. The movement from $g^2$ to $h$ brings the device to the vertical position of Fig. 6, in which position the blank is enclosed in the mold, and the pressure of air which preferably has been decreased during the oscillating period is again increased so as to cause the blank to conform to the shape of the mold. From $h$ to $i$ the device is in the vertical position and the rotation of the same recommences after having been stopped by pinion 30 coming in contact with cam 123 (Fig. 5), causing bevel gear 92 to be taken out of mesh with bevel gear 93 on the jointed shaft 94, 97, which latter normally rotates spindle 43 of the gathering device and with it the gathering member 61, by means of beveled gears 99, 100, and friction cones 101, 74. By its movement from $i$ to $j$ the cam roller 26 returns the gathering device from its vertical position to its horizontal position, at which time, the device remains in substantially horizontal position while the roller moves from $j$ to $a$. During this period the finished blank is removed.

I do not claim herein specifically the construction of the marver nor the combination of the marver and gathering device, this mechanism being the subject matter and specifically claimed in my copending application, Serial No. 594,049, filed November 25, 1910, which is a division of the present application; the instrumentalities by which the marver operation is performed being claimed herein only in combination with other elements of the apparatus.

I have used the term "glass pot" in the specification and claims to indicate the receptacle for containing the molten glass. The term is not used in the narrow sense but is intended to embrace a receptacle of any form suitable for containing a supply of glass in condition to be collected by the gathering device.

I claim:

1. In apparatus of the character described, the combination with a glass pot, of a gathering device, means for causing said gathering device to enter the glass in said glass pot and to be removed therefrom, means for causing the gathering device to be oscillated back and forth, mechanism which causes said gathering device to be revolved while in the glass pot, and means for putting said last-mentioned mechanism out of operation during the period of oscillation.

2. In apparatus of the character described, the combination with a glass pot, of a gathering device, a marver and a mold, actuating mechanism which causes the gathering device to enter the glass in the glass pot, moves said gathering device so as to bring the glass collected thereon into contact with the marver, thereafter causes said gathering device to be swung back and forth with the glass collected thereon downward and then brings said gathering device in position to be enclosed by said mold, mechanism for causing said gathering device to revolve, and means for putting said last-mentioned mechanism out of operation while said gathering device is being swung back and forth.

3. In apparatus of the character described, the combination with a glass pot, of a gathering device which is mounted so as to oscillate, means for dipping the same into and removing the same from the glass pot, a marver, means for swinging the gathering device so that the glass collected on the same is brought into contact with the marver, means for causing said gathering device to be oscillated back and forth with the glass collected thereon downward, a mold adapted to enclose the glass on said gathering device when the latter is in vertical position, means for swinging said gathering device out of vertical position, mechanism for revolving the gathering device, and means for putting said last-mentioned mechanism out of operation while said gathering device is being oscillated back and forth.

4. In apparatus of the character described, the combination with a glass pot, of an oscillating axially revoluble gathering device, supporting means for said gathering device which has circular movement, a marver mounted on said supporting means, and means for causing said gathering device to be dipped in said glass pot and thereafter moved so as to bring the glass collected thereon into contact with the marver comprising a stationary cam, a slide on said supporting means, a cam follower on said slide, a pinion on said slide, a rack fixed to said supporting means, a transmitting rod slidable with respect to said slide and provided with a rack, said racks being in mesh with said pinion, and engaging means between the other end of said rod and said gathering device.

5. In apparatus of the character described, the combination with a glass pot, of an oscillating axially revoluble gathering device, supporting means for said gathering device which has circular movement, a marver pivotally mounted on said supporting means, and means for causing said gathering device to be dipped in said glass pot and thereafter moved so as to bring the glass collected thereon into contact with the marver comprising a stationary cam, a slide on said supporting means, a cam follower on said slide, a pinion on said slide, a rack fixed to said supporting means, a transmitting rod slidable with respect to said slide and provided with a rack, said racks being in mesh with said pinion, engaging means between the other end of said rod and said gathering device, and means comprising a stationary cam for tilting said marver.

6. In apparatus of the character described, the combination with a glass pot, of an oscillating gathering device, supporting means for said gathering device which has circular movement, a marver mounted on said supporting means, means for causing said gathering device to be dipped in said glass pot and thereafter moved so as to bring the glass collected thereon into contact with the marver comprising a stationary cam, a slide on said supporting means, a cam follower on said slide, a pinion on said slide, a rack fixed to said supporting means, a transmitting rod slidable with respect to said slide and provided with a rack, said racks being in mesh with said pinion, engaging means between the other end of said rod and said gathering device, said gathering device comprising an axially revoluble gathering member and means for revolving the same in the glass pot and in the marver comprising a stationary rack, a pinion on said supporting means and a driving connection between said pinion and said gathering member.

7. In apparatus of the character described, the combination with supporting means having circular movement, a stationary cam and a stationary rack around which said supporting means is moved, an oscillating gathering device on said supporting means comprising an axially revoluble gathering member, a stationary glass pot, a marver on said supporting means, means for oscillating the gathering device which is actuated from said stationary cam, and means for revolving said gathering member which is actuated from said stationary rack.

8. In apparatus of the character described, the combination with supporting means having circular movement, a stationary cam and a stationary rack around which said supporting means is moved, an oscillating gathering device on said supporting means comprising an axially revoluble gathering member, a glass pot, a marver on said supporting means, means for oscillating the gathering device which is actuated from said stationary cam, means for revolving said gathering member which is actuated from said stationary rack, and means for causing the marver to occupy an angular position with respect to the gathering device while the glass on said gathering device is in contact with said marver.

9. In apparatus of the character described, the combination with supporting means having circular movement, a stationary cam and a stationary rack around which said supporting means is moved, an oscillating gathering device on said supporting means comprising an axially revoluble gathering member, a glass pot, a marver on said supporting means, means for oscillating the gathering device which is actuated from said stationary cam, means for revolving said gathering member which is actuated from said stationary rack, and means for automatically putting said means for revolving the gathering member out of operation.

10. In a machine for the manufacture of glass articles, the combination with a horizontally pivoted blow-pipe, a motor and means driven thereby in a predetermined order and time for moving the pivot of the blow-pipe to effect a translatory movement of the blow-pipe as a whole and to oscillate the blow-pipe on its horizontal axis to swing the gather on the blow-pipe.

11. In a machine for the manufacture of glass articles, the combination with a blow-pipe supporting frame, a blow-pipe pivoted therein on a horizontal axis, a motor and means driven thereby in a predetermined order and time for moving the supporting frame to effect a translatory movement of the blow-pipe as a whole and to oscillate the blow-pipe on its horizontal axis to swing the gather on the blow-pipe.

12. In a machine for the manufacture of glass articles, the combination with a pivoted blow-pipe supporting frame, mounted to move in a horizontal plane, a blow-pipe pivoted therein on a horizontal axis, a motor and means driven thereby in a predetermined order and time for moving the frame in a horizontal plane to effect a translatory movement of the blow-pipe as a whole, and to oscillate the blow-pipe on its horizontal axis to swing the gather on the blow-pipe.

13. In a machine for the manufacture of glass articles, the combination with a horizontally traveling frame, a blow-pipe mounted thereon on a horizontal pivot, and means actuated by the travel of the frame to oscillate the blow-pipe to swing the gather carried thereby.

14. In a machine for the manufacture of glass articles, the combination with a glass carrier having a horizontal pivotal mounting, a support for the pivot of the carrier mounted to move from one position to another position in the same horizontal plane, a motor, and means driven thereby in a predetermined order and time to effect a translatory movement of the carrier as a whole and to move the carrier with the glass thereon through predetermined oscillations about its horizontal axis to "swing" the glass.

15. The combination with blowing and molding mechanisms of a glass carrier, a motor, and means driven thereby to periodically oscillate the carrier and the glass thereon upon a horizontal axis to "swing" the glass and to present the glass upon the carrier after such periodic oscillation to the molding mechanism.

16. In apparatus of the character described, the combination with a gathering device which is mounted so as to be capable of oscillation, of mechanism for causing the same to revolve, means for oscillating said device, and means for putting the mechanism for revolving the device out of operation during the period of oscillation.

17. In apparatus of the character described, the combination with supporting means and a cam, one of the same being adapted to revolve and the other of which is stationary, a gathering device mounted so as to oscillate on said supporting means, means actuated by said cam for causing said gathering device to oscillate, a circular rack having a rigid relation with respect to said cam, and mechanism comprising a pinion meshed therewith which causes said gathering device to revolve.

18. In apparatus of the character described, the combination with supporting means and a cam, one of the same being adapted to revolve and the other of which is stationary, a gathering device mounted so as to oscillate on said supporting means, means actuated by said cam for causing said gathering means to oscillate, a circular rack having a rigid relation with respect to said cam, mechanism adapted to be actuated from said rack to cause said gathering device to revolve, and means for automatically putting said mechanism out of operative realtionship with said rack.

19. In apparatus of the character described, the combination with supporting means and a circular rack, one of the same being adapted to revolve and the other of which is stationary; a gathering device mounted so as to oscillate on said supporting means, and mechanism comprising a pinion which meshes with said rack for causing said gathering device to be revolved.

20. In apparatus of the character described, the combination with supporting means and a circular rack one of the same being adapted to revolve and the other of which is stationary; a gathering device mounted so as to oscillate on said supporting means, mechanism adapted to be actuated from said rack to cause said gathering device to be revolved, and means for automatically putting said mechanism out of operative relation with said rack.

21. In apparatus of the character described, the combination with a stationary support, of a cam on said support, of supporting means which revolves about the same, a gathering device which is mounted so as to oscillate on said supporting means, means actuated by said cam for causing said gathering device to oscillate, a circular rack on said stationary support, and mechanism comprising a pinion which meshes with said rack for causing said gathering device to be revolved.

22. In apparatus of the character described, the combination with a stationary support, of a cam on said support, of supporting means which revolves about the same, a gathering device which is mounted so as to oscillate on said supporting means, means actuated by said cam for causing said gathering device to oscillate, a circular rack on said stationary support, mechanism comprising a pinion which meshes with said rack for causing said gathering device to be revolved, a segmental cam on said stationary support, and means actuated thereby which puts the mechanism for revolving the gathering device out of operation.

23. In apparatus of the character described, the combination with supporting means, of a gathering device mounted thereon so as to oscillate and mechanism for oscillating the same comprising a cam, a follower for the same, a slide on which the follower is mounted, a pinion on the slide, a stationary rack with which said pinion meshes, an oscillating spur on said gathering device and a transmission rod slidable with respect to said slide provided with a rack which is meshed by the pinion on the slide, and a rack which meshes with said oscillating spur.

24. In apparatus of the character described, the combination with supporting means, of a gathering device mounted thereon so as to oscillate and mechanism for oscillating the same comprising a cam, a follower for the same, a slide on which the follower is mounted, a pinion on the slide, a stationary rack with which said pinion meshes, an oscillating spur on said gathering device and a transmission rod slidable with respect to said slide provided with a rack which is meshed by the pinion on the slide, and a rack which meshes with said oscillating spur, said supporting means having circular movement with respect to said cam.

25. In apparatus of the character described, the combination with supporting means, of a gathering device mounted thereon so as to oscillate and mechanism for oscillating the same comprising a cam, a follower for the same, a slide on which the follower is mounted, means for transmitting movement from the slide to said gathering device, means for revolving said gathering device, and means for automatically putting the means for producing the revolving movement of the gathering device out of operation.

26. In apparatus of the character described, the combination with supporting means, of a gathering device mounted thereon so as to oscillate and mechanism for oscillating the same comprising a cam, a follower for the same, a slide on which the follower is mounted, a pinion on the slide, a stationary rack with which said pinion meshes, an oscillating spur on said gathering device and a transmission rod slidable with respect to said slide provided with a rack which is meshed by the pinion on the slide, a rack which meshes with said oscillating spur, and mechanism for causing said gathering device to be revolved.

27. In apparatus of the character described, the combination with supporting means, of a gathering device mounted thereon so as to oscillate and mechanism for oscillating the same comprising a cam, a follower for the same, a slide on which the follower is mounted, a pinion on the slide, a stationary rack with which said pinion meshes, an oscillating spur on said gathering device and a transmission rod slidable with respect to said slide provided with a rack which is meshed by the pinion on the slide, a rack which meshes with said oscillating spur, mechanism for causing said gathering device to be revolved, and means for automatically putting said last-mentioned mechanism out of operation.

28. In apparatus of the character described, the combination with supporting means, of a gathering device mounted thereon so as to oscillate and mechanism for oscillating the same comprising a cam, a follower for the same, a slide on which the follower is mounted, a pinion on the slide, a stationary rack with which said pinion meshes, an oscillating spur on said gathering device and a transmission rod slidable with respect to said slide provided with a rack which is meshed by the pinion on the slide, a rack which meshes with said oscillating spur, said supporting means having circular movement with respect to said cam, and mechanism for causing said gathering device to be revolved.

29. In apparatus of the character described, the combination with supporting means, of a gathering device mounted thereon so as to oscillate and mechanism for oscillating the same comprising a cam, a follower for the same, a slide on which the follower is mounted, a pinion on the slide, a stationary rack with which said pinion meshes, an oscillating spur on said gathering device and a transmission rod slidable with respect to said slide provided with a rack which is meshed by the pinion on the slide, a rack which meshes with said oscillating spur, said supporting means having circular movement with respect to said cam, mechanism for causing said gathering device to be revolved, and a cam adapted to be engaged by a part of said last-mentioned mechanism which puts the same out of operation.

30. In apparatus of the character described, the combination with supporting means, of a gathering device mounted thereon so as to oscillate and mechanism for oscillating the same comprising a cam, a follower for the same, a slide on which the follower is mounted, a pinion on the slide, a stationary rack with which said pinion meshes, an oscillating spur on said gathering device and a transmission rod slidable with respect to said slide provided with a rack which is meshed by the pinion on the slide, a rack which meshes with said oscillating spur, said supporting means having circular movement with respect to said cam, a stationary circular rack, and driving means operated from said rack which causes said gathering device to be revolved.

31. In apparatus of the character described, the combination with supporting means, of a gathering device mounted thereon so as to oscillate and mechanism for oscillating the same comprising a cam, a follower for the same, a slide on which the follower is mounted, a pinion on the slide, a stationary rack with which said pinion meshes, an oscillating spur on said gathering device and a transmission rod slidable with respect to said slide provided with a rack which is meshed by the pinion on the slide, a rack which meshes with said oscillating spur, said supporting means having circular movement with respect to said cam, a stationary rack, a gear meshed with said rack, a shaft on which said gear is rigidly mounted, which shaft is mounted on said supporting device so as to have lengthwise movement, a bevel gear on said shaft, a driving connection between said bevel gear and said gathering device whereby the latter is caused to revolve comprising a bevel gear which normally meshes with said first-mentioned bevel gear, and a cam which moves said shaft lengthwise so as to take said bevel gears out of mesh with each other.

32. In apparatus of the character described, the combination with movable supporting means, of a gathering device on said supporting means comprising an axially revoluble gathering member, and mechanism for revolving the gathering member comprising a stationary rack, a pinion on the movable supporting means, and a driving connection between said pinion and said gathering member.

33. In apparatus of the character described, the combination with supporting means, of a gathering device comprising an axially revoluble gathering member, mechanism for revolving the latter comprising a rack and pinion and a driving connection between said pinion and said gathering member; and means for automatically putting said driving connection out of operation.

34. In apparatus of the character described, the combination with movable supporting means, of a gathering device on said supporting means comprising an axially revoluble gathering member, mechanism for revolving the gathering member comprising a stationary rack, a pinion on the movable supporting means and a driving connection between said pinion and said gathering member, and means for oscillating said gathering device.

35. In apparatus of the character described, the combination with supporting means, of a gathering device mounted thereon comprising an axially revoluble gathering member, a circular rack around which said supporting means is adapted to be moved, mechanism for revolving said gathering member comprising a pinion meshing with said rack and a driving connection between said pinion and said gathering member, and a cam having fixed relation with respect to said rack adapted to put the mechanism for revolving the gathering member out of operation.

36. In apparatus of the character described, the combination with a stationary circular rack, of supporting means adapted to be moved around said rack, a gathering device mounted on said supporting means comprising an axially revoluble gathering member, a friction cone on said gathering member and driving means comprising a friction cone which engages said first named friction cone, and a pinion which is meshed with said rack for revolving said gathering member.

37. In apparatus of the character described, the combination with a stationary circular rack, of supporting means adapted to be moved around said rack, a gathering device mounted on said supporting means comprising an axially revoluble gathering member, a shaft mounted on said supporting means so as to have longitudinal movement, a pinion rigid on said shaft which meshes with said rack, a gear wheel on said shaft, a driving mechanism comprising a second gear wheel meshed with the other gear wheel for revolving said gathering member, and a cam adapted to shift said shaft longitudinally so as to throw said gear wheels out of mesh.

38. In apparatus of the character described, the combination with supporting means, of a gathering device comprising a casing, a rocking shaft to which said casing is secured, a spur gear on said shaft and a rack bar meshing with the same whereby said shaft may be rocked, a shaft which rotatably supports the casing on the other side of the first-mentioned shaft, a gathering member revolubly mounted with respect to said casing, and coengaging means on said last-mentioned shaft and said gathering member for revolving the latter.

39. In apparatus of the character described, the combination with supporting means, of a gathering device comprising a casing, a rocking shaft to which said casing is secured, a spur gear on said shaft and a rack bar meshing with the same whereby said shaft may be rocked, a shaft which rotatably supports the casing on the other side of the first-mentioned shaft, a gathering member revolubly mounted with respect to said casing, and means on said last-mentioned shaft and said gathering member for revolving the latter comprising a pair of friction cones.

40. In apparatus of the character described, the combination with supporting means, of a gathering device comprising a hollow casing mounted so as to oscillate on said supporting means, a spindle within said casing and projecting therefrom, said spindle provided with a bore, a tubular gathering member which extends into said bore, means for securing said gathering member on said spindle, means for revolving said spindle, means whereby compressed air may be admitted to the interior of said casing, a gasket of compressible material within the bore of said spindle and a spring which forces said gasket against the end of the gathering member.

41. In apparatus of the character described, the combination with supporting means, of a gathering device comprising an oscillating casing, a supporting shaft for the same, an axially revoluble gathering member, and means comprising a pair of friction cones, one on said supporting shaft and one operatively connected with said gathering member for revolving said member.

42. In apparatus of the character described, the combination with supporting means, of a gathering device comprising an oscillating casing, an axially revoluble gathering member, means comprising a pair of friction cones for revolving said gathering member, and means comprising a pinion connected with said casing and a rack for oscillating said casing.

43. In apparatus of the character described, the combination with supporting means, of a gathering device comprising an oscillating casing, a spindle provided with a bore revolubly mounted in said casing and projecting therefrom, a gathering member secured within the bore of said spindle formed with a recess, said shaft being formed with a perforation corresponding to said recess, a spring-pressed sleeve on said spindle adapted to cover said perforation, a stop for said sleeve on said spindle, and a ball which seats in said perforation and in the recess in said gathering member.

44. In apparatus of the character described, the combination with supporting means, of a gathering device comprising a revoluble spindle having a bore, a gathering member which projects into said bore and is formed with a recess, the spindle being formed with a perforation which corresponds with said recess, a ball which seats in said perforation and recess and a sleeve slidable on said spindle which is adapted to close said perforation.

45. In apparatus of the character described, the combination with supporting means, of a gathering device comprising a revoluble spindle having a bore, a gathering member which projects into said bore and is formed with a recess, the spindle being formed with a perforation which corresponds with said recess, a ball which seats in said perforation and recess, a sleeve slidable on said spindle which is adapted to close said perforation, a gasket in said bore and a spring which presses said gasket against the end of said gathering member.

46. In apparatus of the character described, the combination with movable supporting means, of a gathering device mounted thereon so as to oscillate comprising an axially revoluble gathering member, and means actuated by the movement of said supporting means for oscillating said gathering device and for revolving said gathering member.

47. In apparatus of the character described, the combination with supporting means having a circular movement, of a gathering device mounted thereon so as to oscillate comprising an axially revoluble gathering member, means for oscillating said gathering device comprising a stationary cam and mechanism connected with said gathering device which is actuated by contact with said cam, means for revolving said gathering member comprising a circular rack and driving mechanism operated from said rack, and a stationary cam which puts said last-mentioned mechanism out of operation.

48. In apparatus of the character described, the combination with movable supporting means, of an oscillating gathering device comprising an axially revoluble gathering member, mechanism for revolving the latter, means for oscillating said gathering device back and forth comprising a cam having a wavy contour, a cam follower, a slide on said supporting means, on which said cam follower is mounted, a pinion on said slide, a rack fixed to said supporting means, a sliding transmitting rod provided with a rack, said racks being meshed by said pinion and engaging means between the other end of said rod and said gathering device; and a stationary cam located under the above mentioned cam which puts the mechanism for revolving said gathering member out of operation.

49. In apparatus of the character described, the combination with movable supporting means, of an oscillating gathering device, means for oscillating said gathering device back and forth comprising a cam having a wavy contour, a cam follower, a slide on said supporting means, on which said cam follower is mounted, a pinion on said slide, a rack fixed to said supporting means, a sliding transmitting rod provided with a rack, said racks being meshed by said pinion, and engaging means between the other end of said rod and said gathering device.

50. The combination with a gathering device, of supporting means on which said gathering device is pivotally mounted, said supporting means adapted to have circular movement, and mechanism for causing said gathering device to be oscillated in a direction transverse to the plane of movement of the supporting device, comprising a stationary cam, a slide on said supporting means having a follower engaging said cam, a pinion on said slide, a rack fixed to said supporting means with which said pinion meshes, a transmission rod formed with a rack meshed by said pinion, a spur on said gathering device, and a rack on said rod which meshes with said spur.

51. The combination with a gathering device of supporting means on which said gathering device is pivotally mounted, said supporting means adapted to have circular movement, mechanism for causing said gathering device to be oscillated transversely to the plane of movement of said supporting means comprising a stationary cam, a slide on said supporting means having a follower engaging said cam, a pinion on said slide, a rack fixed to said supporting means with which said pinion meshes, a transmission rod formed with a rack meshed by said pinion, a spur on said gathering device, and a rack on said rod which meshes with said spur, said gathering device comprising an axially revoluble gathering member; and means for revolving the latter comprising a stationary circular rack, a pinion on said supporting means meshing with said rack, and a driving mechanism connected with said last-mentioned pinion and with said gathering member.

AUGUST KADOW.

Witnesses:
   John W. Kimball,
   J. D. Robinson.